United States Patent Office 3,080,700
Patented Mar. 12, 1963

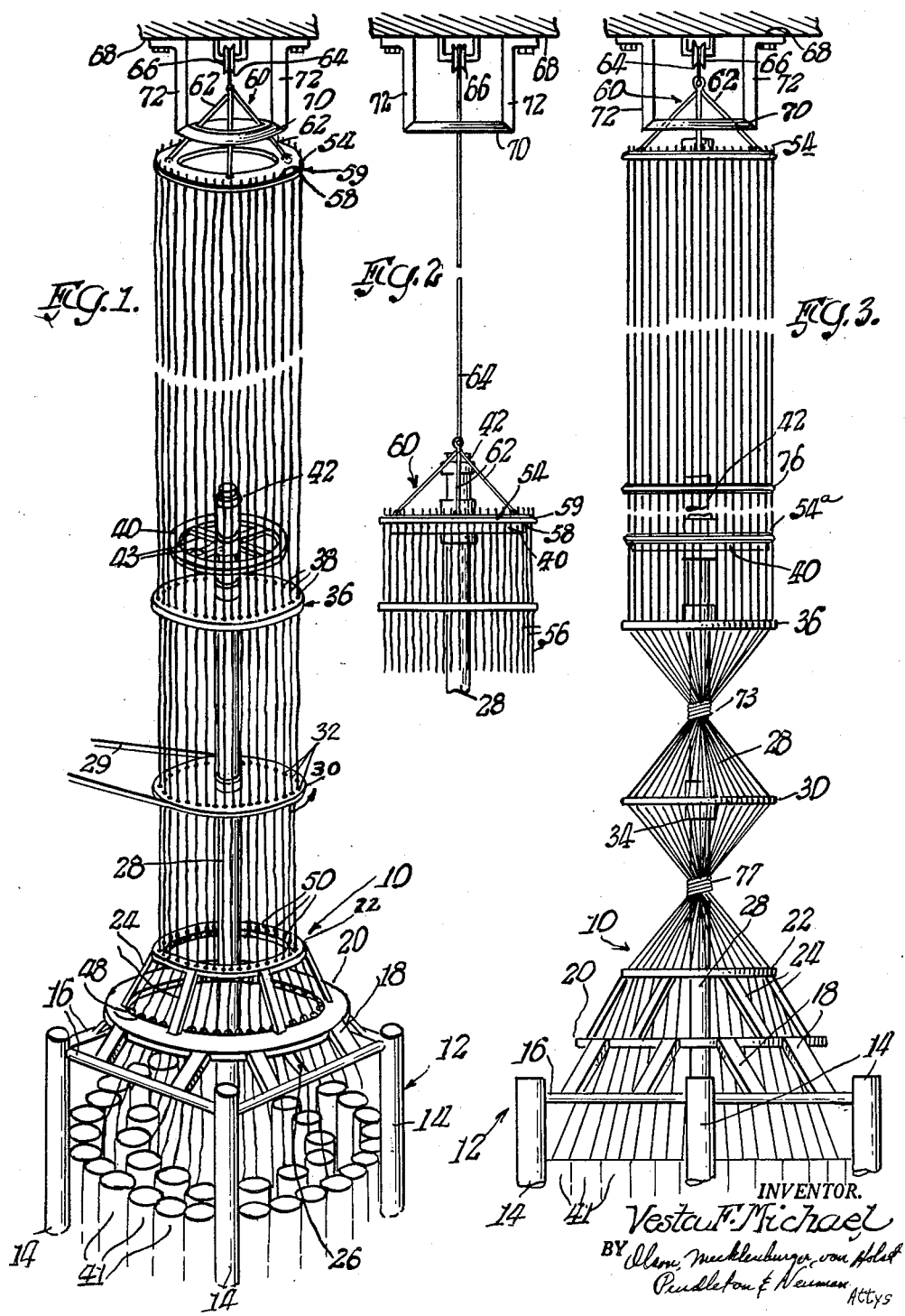

3,080,700
APPARATUS AND METHOD FOR MAKING PARALLEL STRAND ASSEMBLAGES
Vesta F. Michael, Wichita, Kans., assignor to Rock Island Oil & Refining Co., Inc., Wichita, Kans., a corporation of Kansas
Filed Jan. 23, 1961, Ser. No. 83,996
19 Claims. (Cl. 57—1)

This invention relates to a novel apparatus and method for forming assemblages of parallel strands and more particularly pertains to a method and apparatus for forming a component of a glass fiber-plastic pipe.

Glass fiber-plastic pipes are well known and serve a number of uses for which ordinary metal pipes are unsuitable. For instance, a large number of corrosive liquids which cannot be carried in an ordinary metal pipe may be carried with no deleterious effects in a glass-resin pipe.

The glass component of the usual glass-plastic pipe may comprise glass fibers arranged in a variety of forms. Glass filaments in the form of yarn or roving have been used to advantage in pipes of this type. Roving has been found to be particularly satisfactory since the straight untwisted filament condition assures optimum strength in the pipe formed as forces exerted on the filaments may be directly reacted to with the entire filament tensile strength.

In one method of pipe formation a layer of glass roving which is saturated with a resin is helically wound about a mandrel which may be covered with a paper cover to facilitate removal of the formed pipe therefrom. Parallel roving strands which are also ultimately embedded in cured resin are arranged substantially parallel to the mandrel longitudinal axis and then disposed over the helical wrap. Both the helical roving and longitudinal strands are applied to the mandrel in a stressed condition under tension whereby the burst and tensile strengths of the final pipe product following the resin cure are enhanced. The strands are saturated with uncured resin and following resin cure the strands under tension are firmly embedded in a solid mass of cured resin. As many helical wraps and longitudinal layers are employed in the pipe as are believed necessary for the particular pipe being formed. Plastic pipes subjected to severe compressive forces normal to the longitudinal axis will have a sufficient number of spiral wraps to resist such forces. Pipes subjected to severe tensile forces such as might be imposed on pipes hung in a deep well will accordingly employ a sufficient number of layers of longitudinal strands.

The longitudinal strands of glass roving in accordance with one method of pipe manufacture are disposed in alternate arrangement with helical layers of glass roving, the longitudinal strands being in the form of an integral sock or cylindrical skirt of roving strands of equal length. The strands are secured at opposite end limits to anchor members which may comprise rings or plates fixedly clamped in place relative to the mandrel and helical roving about which they are disposed. The anchor rings may engage outer peripheries of rotating spindles which engage the mandrel ends and rotate as a unit with the mandrel and other glass layers which may be disposed thereon. In the course being fixedly clamped in place the anchor rings to which the parallel roving strands are attached are forced apart a predetermined distance whereby the glass roving strands are placed under tension. In such stressed condition the longitudinal strands become an integral part of the glass-resin pipe. One form of apparatus for use with the strand assemblage of this invention is disclosed in my copending application S.N. 84,069, filed January 23, 1961. Since such apparatus comprises no part of this invention the same is not illustrated in the accompanying drawing.

Inasmuch as a plurality of roving socks of longitudinal strands are normally necessary for each pipe it becomes essential for efficient pipe manufacture to devise a method of readily forming the socks of roving strands which are equal in length so that stress in all the strands of each sock will be substantially equal in the final pipe product. Unless the roving strands are equal in length they will be under different stresses when the anchor rings to which they are attached are forced apart and thus the pipe formed therefrom will have varying tensile strength about its periphery.

It is an object of this invention to provide an apparatus and method for forming assemblages of glass roving strands which are of equal length and accordingly provide uniform tensile strengths in plastic pipes in which employed.

It is another object of this invention to provide an apparatus and method which will form assemblages of longitudinal parallel strands in a substantially continuous manner and with a minimum number of steps.

It is a still further object of this invention to provide an apparatus for forming assemblages of longitudinal strands which is flexible in operation, composed of a minimum number of parts and simple to operate.

In one embodiment of this invention a plurality of continuous glass roving strands are threaded at right angles through a peripherally apertured, rotatable guide plate and through peripheral apertures in a spaced, fixed guide plate similar to said rotatable plate. The strands after passing through the fixed plate are secured to the periphery of a movable anchor ring which may be moved desired distances from said fixed guide plate. After the anchor ring has been moved a desired distance it is fixedly positioned and disposed transversely to the strands attached thereto. In the course of passing through the plates and in the course of anchor ring movement the glass roving strands remain in parallel untwisted relationship defining a cylindrical peripheral surface.

Following movement of the anchor ring and positioning of the same, the movable guide plate is rotated, concomitantly twisting together the roving strand portions between said rotatable guide plate and said fixed guide plate and exerting equal tensions on each roving strand portion disposed between said anchor ring and said fixed plate as a result of the decreasing strand lengths resulting from the twisting step. Prior to placing the upper distal strand portions under tension, second and third anchor rings are disposed within the strand cyclindrical periphery in the interval between the first anchor ring and guide plate transversely to the strands, and the strands secured to the two ring peripheries. The second anchor ring is disposed closer to said first anchor ring in the normal position of assembly.

The strand portions between the second and third anchor rings may then be cut forming a strand cylinder composed of strands of equal length between the first and second anchor rings. The third anchor ring may then be moved relative to the fixed guide plate, extending the strands attached thereto, and function as the above-described first anchor ring. Additional anchor rings may then be inserted within the strand cylinder periphery, the strands placed under tension, and another integral strand cylinder formed by cutting as will hereinafter be explained in greater detail.

For more complete understanding of this invention, reference will now be made to the drawing wherein, FIGURE 1 is a fragmentary perspective view of elements of one form of apparatus which may be employed for forming strand assemblages;

FIG. 2 is a fragmentary side elevational view illustrating the normal position of the upper portion of the provided apparatus prior to extending the strands to the position of FIG. 1, and FIG. 3 is a fragmentary side elevational view of the assembly illustrated in FIG. 1 with additional anchor rings illustrated in place and the upper strand portions under tension.

Referring now more particularly to FIG. 1, one embodiment of an apparatus which may be employed for purposes of forming longitudinal strands of glass filaments in assembled relationship is illustrated. As has been above described, the assemblage of strands is particularly adapted for use in the formation of a glass-cured resin pipe. However, it should be noted that the illustrated apparatus may be employed for puposes of forming assemblages of any elongate strands which are of equal length and which may be handled as hereinafter described, regardless of the purpose for which intended. This invention is not, therefore, limited to the formation of elongate horizontal assemblies of strands sometimes hereinafter referred to as a "sock" adapted only for use in glass-resin pipe formation.

As seen from FIGS. 1 and 3, the apparatus assembly 10 is composed of a minimum number of parts, each of which is relatively inexpensive to manufacture. In the figures, a support 12 is composed of a number of vertical rod members 14 which are interconnected and maintained in spaced relationship by smaller horizontal rod members 16. Welded, or otherwise affixed to the horizontally disposed rods 16, are a plurality of supporting plate members 18 which are affixed to the rods 16 at their lower end limits and which support ring 20 at their upper end limits. Ring 20 in turn supports a smaller overlying concentric ring 22 by means of interposed plate members 24. Also supported by the framework 12 and directly supported by transverse rod members 26, more clearly seen in FIG. 1, is a centrally disposed vertically extending shaft 28 which is concentric with the previously described support assembly 12.

Spaced from the lower end limit of the vertical shaft 28 and mounted on said shaft is a rotatable plate 30 which is uniformly apertured about a peripheral portion thereof at 32. The plate 30 rotates relative to an underlying bearing member 34, more clearly seen in FIG. 3. Disposed above rotatable plate 30 and fixedly secured to the central shaft 28 is a guide plate 36 which may be of substantially the same construction as the underlying rotatable plate 30 and is accordingly similarly apertured at 38 about an outer peripheral portion thereof. Disposed upwardly of fixed plate 36 on shaft 28 is a support ring 40 fixedly connected to the shaft 28 by means of spoke bars 43. Disposed on an upper terminal portion of shaft 28 is a collar member 42.

In the normal course of forming strand assemblages or socks which are particularly adapted for use in the formation of glass-plastic pipes the following steps are carried out. Spools of glass yarn or roving, or other form of glass filaments, are disposed beneath the illustrated apparatus and rest on the underlying floor or other support surface. The free ends of spools 41, which for instance may be of glass roving which has been found particularly suitable for glass pipe manufacture, are threaded through eyelets 48 disposed about the inner periphery of ring 20 and passed upwardly through apertures 50 of ring 22 disposed above the larger ring 20. The distal free ends of rovings 56 are threaded through the apertures of the overlying rotatable plate 30 and apertures 38 of guide plate 36 disposed above plate 30.

It is the function of ring 40 to support a reciprocally movable anchor ring or plate, such as ring 54 shown in place on shaft 28 in FIG. 2. In order to initiate apparatus operation, the upwardly extending distal ends of each roving member, such as the illustrated rovings 56, after passing through fixed plate 36 are fixedly secured to the periphery of the reciprocally movable anchor ring 54. Ring 54 is not peripherally apertured and as is apparent from FIG. 2, the rovings 56 may be secured to the outer periphery of ring 54 by any of numerous means, such for instance as a rubber band which may be disposed about the outer periphery of plate 54 over rovings 56. In FIG. 2 a rubber band 58 is illustrated in place. In addition to a rubber band, a metal band 59 may be readily locked about band 58 to resiliently urge band 58 against the outer periphery of ring 54, thereby securely locking the roving ends to the periphery of ring 54.

Following this initial threading and securing operation, the ring 54 which is readily reciprocably movable may be engaged by means of a detachable hook, such as hook 60 composed of four downwardly and outwardly extending collapsible legs 62. The hook 60 is in turn engaged by a cable 64, which may reciprocably move ring 54, with the assistance of a pulley member, such as pulley 66 supported by the overlying ceiling 68. After locking the distal roving ends to the periphery of ring 54 the ring is raised from the position of FIG. 2 to the position of FIG. 1. Steps are then carried out for producing a cylindrical sock or assemblage of rovings 56 of desired length, each roving of such assemblage being identical in length will all others. Ring 54 defines the upper end of such sock to be formed.

It will be noted from the drawing that an annular ring 70 defining the periphery of a cone frustum depends from ceiling 68 by means of connecting arms 72. It is the purpose of ring 70 to uniformly engage each of the four legs 62 of hook 60 and assure a horizontal disposition of ring 54 when in its uppermost position of FIG. 1.

Rings 70, which acts as a stop for hook 60 and thereby defines the upper end limit of the reciprocal movement of ring 54, is spaced a predetermined distance from an underlying anchor ring or plate, such as ring 76 illustrated in FIG. 3 which rests on collar 42 disposed atop the central shaft 28. The interval between ring 54 in the raised position and the ring 76 as shown in FIG. 3 defines the normal strand length of the sock formed by the illustrated apparatus. For purposes of arriving at a desired interval, ring 70 may be adjustable relative to ceiling 68, or collar 42 may be adjustable on shaft 28 or the entire shaft may be movable in the vertical plane relative to the supporting structure 12.

Accordingly, after it has been determined what length for rovings 56 is desired in the assemblage to be formed, collar 42 may be appropriately disposed relative to overlying ring 70. As has been mentioned above, it is desired that each roving 56 of the assemblage to be formed be of equal length so that the tension in each roving 56 extending between the reciprocally movable anchor ring 54 and the underlying removable anchor ring 76, illustrated in FIG. 3, be of a substantially constant value when the same is incorporated in a final pipe product.

To assure equal length and equal tensions in the roving assemblages formed, the rotatable plate 30 of the drawing is employed. It is the function of this plate to rotate and concomitantly twist the free hanging strand portions disposed between fixed plate 36 and the rotatable plate 30 in the manner illustrated in FIG. 3 and thereby lock the upper portions of the strands in a position in which equal tension exists in each of the strands. Uniform strand tension and length is obtained as strand portions depending below guide 36 are wound about shaft 28 and their length reduced. The knot 73 which is formed after plate 30 has been rotated serves as a lock securing the tensioned strand portions between ring 54 and plate 36 in fixed position. As seen in FIG. 3, lower knot 77 also forms about central shaft 28 between plate 30 and ring 22. The twisting of the plate 30 thus assures equalizing of the strand lengths between ring 54 and fixed plate 36.

To insure the impressing of uniform tension on the strands of the formed assemblages in the normal course of apparatus operation, rotation of plate 30 may be carried out by means of a motor which exerts a predetermined torque on the plate 30 or by turning the plate by hand a predetermined number of turns. A drive belt 29 is fragmentarily illustrated in FIG. 1.

In the apparatus illustrated in FIG. 3, the strand portions disposed between ring 54 and ring 76 are of equal length. The desired assemblage length has been selected as that length extending between ring 54 in the raised position of FIG. 1 and ring 76 disposed atop a distal portion of shaft 28. When the strands are in the loosely hanging untwisted condition of FIG. 1, rings 54a and 76 are inserted in position on supports 40 and 42 respectively. Adjacent outer peripheral portions of the glass strand assemblage are locked to the outer peripheries of first ring 54a and then ring 76 by means of a rubber band and metal band assembly, such as previously described bands 58 and 59, or other equivalent means which assure locking of the strands to the plate peripheries. The locking steps are effected only after the above tensioning step has been carried out. By securing the strands to ring 54a before ring 76 all strand portions disposed above knot 73 are in a state of substantially uniform tension following the locking steps. It will be seen from FIG. 3, therefore, that the desired strand assemblage is that defined by the strands extending from raised ring 54 to underlying ring 76. If merely one assemblage was to be made, each strand 56 would then be cut adjacent the under-surface of ring 76 of FIG. 3 and the assemblage defined by rings 54, 76 and the strand portions interposed therebetween, would be removed to a place of use.

It is apparent, however, that if this cutting operation were carried out, the loose ends extending above plate 36 would then have to be laboriously secured to another reciprocally movable ring such as ring 54a of FIG. 3, which would be raised into the position of plate 54 of FIG. 1. To obviate such a tedious securing job, plate 54a illustrated in FIG. 3, resting on support 40, is inserted within the cylindrical arrangement of strands as previously described with the insertion of ring 76.

It is desired, therefore, that peripheral portions of the strands of FIG. 3 disposed above plate 36 be secured to both rings 76 and 54a prior to cutting. Following the cutting of the strand portions between the rings 76 and 54a, the strand portions beneath ring 76 will be firmly anchored to ring 54a. Ring 54a may then be engaged by detachable hook 60 and raised to the position of plate 54 of FIG. 1, whereafter additional anchor rings similar to rings 76 and 54a of FIG. 3 are inserted within the cylinder defined by the glass roving prior to the previously described twisting and cutting operations.

It is thus seen that a continuous method has been devised for forming assemblages of strand members, each strand of which is equal with all others of the assemblage. It is preferred that shaft 28 be disposed vertically as illustrated in the drawing, with the various plates and rings disposed transversely thereto in horizontal planes to insure the uniform free-hanging condition of each roving member 56 prior to the twisting operation of FIG. 2. Since all the strands are freely hanging, rotation of plate 30 will readily impart equal tension in strand portions disposed between rings 54 and 36. It is conceivable, however, that shaft 28 may be horizontally disposed and the remaining plate members similarly rearranged in position 90 degrees. Instead of a cable 64, the reciprocal movable anchor plate would of necessity move along a central guide into its predetermined position.

It is apparent from the foregoing that the diameter of the anchor rings and length of the roving assemblages may be changed at will. It may also be desirable for particular applications that the strands of the formed assemblages be in a twisted nonparallel relationship in a desired position of use. Equal tension may be imparted on such an assemblage of strands by anchoring plate 54 in a desired position relative to guide 36 prior to twisting plate 30, or rendering guide 36 rotatably movable into fixed positions relative to ring 54.

It is apparent that a number of changes may be made in the illustrated apparatus and the resultant combinations will still remain within the ambit of the invention disclosed. This invention, therefore, is to be limited only by the scope of the appended claims.

I claim:

1. In a device for forming an assemblage of spaced, parallel, resilient strands of equal length the combination comprising first anchor means for engaging distal end portions of such resilient strands to be assembled and maintaining the same in fixed spaced relationship, guide means spaced from said anchor means disposed transversely to said strands and traversed by said strands for maintaining said strands in spaced relationship and disposing the strand portions between said anchor means and said guide means in spaced, untwisted relationship; said strands being freely movable through said guide means, and tension-creating means spaced from said guide means whereby said latter means is interposed between said tension-creating means and said anchor means, said tension-creating means exerting a uniform tension on said strand portions disposed between said guide means and said anchor means by concomitantly twisting and pulling on said strand portions between said tension-creating means and said guide means, said pulling being directed away from said guide means.

2. The combination of claim 1 in combination with second anchor means disposed between said first anchor means and said guide means engaging said strands, and securing means for fixedly securing the engaged strands to said second anchor means.

3. The combination of claim 2 in combination with a third anchor means disposed between said first and second anchor means engaging said strands, and securing means for fixedly securing the engaged strands to said third anchor means.

4. In a process for forming an assemblage of resilient strands of desired length the steps comprising anchoring said strands at one end limit, extending said anchored strands in spaced untwisted relationship relative to a guide means traversed by said strands, and uniformly twisting together the strand portions disposed adjacent the face of said guide means disposed away from the anchored strand end limits so as to concomitantly uniformly place said strand portions between the anchored end limits and said guide means under tension, the interval between the anchored end limits of said strands and the guide means remaining constant during said twisting whereby the tension imparted to the strand portions extending from the anchored end limits to the guide means increases proportionately with the amount of twisting imparted thereto.

5. The process of claim 4 in combination with the steps of anchoring desired lengths of said strands extending from the anchored end limits thereof to a first anchor means disposed between said guide means and said anchored end limits and cutting the strand portions extending between the guide means and said first anchor means.

6. The process of claim 5 in combination with the step of anchoring said strands to a second anchor means disposed between said guide means and said first anchor means after which the strand portions are cut between said second anchor means and said first anchor means.

7. In a process for continuously forming assemblages of glass strands of equal length in substantially parallel cylindrical configuration, the steps comprising passing individual strands from individual strand sources through a first rotatable guide having a plurality of apertures arranged in substantially circular configuration, passing said individual strands from said first rotatable guide through a second apertured guide whereby the strands retain a substantially untwisted relationship between the guides, securing distal end portions of strands to a movable anchor spaced from said guides, said second guide being disposed between said first rotatable guide and said movable anchor, and moving said anchor a desired distance from said guides and fixedly positioning said anchor, twisting together portions of said strands disposed adjacent said first rotatable guide and between said first rotatable guide and said individual strand sources by rotating said first guide and concomitantly exerting tension in said strand portions disposed between said second guide and said movable anchor.

8. The process of claim 7 in combination with the steps of locking said strands to a second anchor disposed between said movable anchor and said second guide and cutting the strand portions between said second anchor and said second guide.

9. The process of claim 7 in combination with the steps of locking said strands to a second and to a third anchor disposed between said movable anchor and said second guide, said second anchor being interposed between said movable anchor and said third anchor, and cutting the strand portions between said second and third anchors.

10. The process of claim 7 in combination with the steps of locking said strands to a second and to a third anchor disposed between said movable anchor and said second guide, said second anchor being interposed between said movable anchor and said third anchor, cutting the strand portions between said second and third anchors, removing said movable anchor and said second anchor and strand portions attached thereto, and moving said third anchor to a desired position spaced from said rotatable guide.

11. In a device for forming an assemblage of spaced parallel strands of equal length the combination comprising first guide means for maintaining said parallel strands in spaced relationship, rotatable apertured means spaced from said first guide means disposed transversely to said strands, said parallel strands passing through the apertures of said apertured means, second apertured guide means spaced from said rotatable apertured means transversely disposed to said strands whereby said rotatable apertured means is interposed between said first and second guide means, anchor means fixedly engaging terminal portions of said strands maintained in spaced relationship with said second guide means whereby said second guide means is interposed between said rotatable means and said anchor means, said rotatable means; second apertured guide means and anchor means having the centers thereof in axial alignment, rotational movement of said rotatable apertured means twisting together the strands disposed between said rotatable apertured means and said first guide means and between said second guide means and said rotatable apertured means.

12. In a device for forming an assemblage of spaced, substantially parallel strands of equal length, the combination comprising a guide having apertures formed therein through which individual strands of such assemblage to be formed may pass, movable first anchor means in axial alignment with said guide for fixedly engaging distal portions of said strands and extending said strands a desired distance in parallel relationship from said guide, and tension-creating means disposed in spaced relationship with said guide whereby said guide is interposed between said movable first anchor means and said tension-creating means, said tension-creating means concomitantly twisting strand portions interposed between said latter means and said guide and causing a tension in the strand portions disposed between said movable first anchor means and said guide.

13. The device of claim 12 in combination with a plurality of removable anchor members positioned between said movable first anchor means and said guide when the strand portions between the latter two members are taut, and securing means for affixing said strands to each of said anchor members.

14. The device of claim 13 in which said guide is fixedly secured to a vertical shaft, said plurality of anchor members are removably positionable on said shaft, and said movable anchor means, said plurality of anchor members and said guide are in concentric axial alignment.

15. In a device for forming an assemblage of spaced parallel strands of desired length the combination comprising a reciprocably movable anchor means, movable in a vertical plane, for fixedly engaging distal end portions of a plurality of strands of such assemblage; individual sources for each of said strands, guide means disposed between said sources and said movable anchor means disposed concentrically with said movable anchor means whereby movement of said movable anchor means relative to said guide means produces a plurality of loose-hanging vertically disposed strand portions in parallel untwisted relationship, tension-creating means disposed between said guide means and said strand sources for creating uniform tension between strand portions disposed between said movable anchor means and said guide means, said tension-creating means uniformly twisting portions of strands disposed between said guide means and said strand sources after rendering said latter portions uniform in length.

16. In a process for forming a plurality of parallel strands of equal length the steps comprising passing a plurality of strands from a plurality of strand sources upwardly through two spaced concentric apertured plate means, vertically extending said strands to a desired length after such passage through said apertured plate means, anchoring the distal strand ends in fixed position, said strands hanging loosely in parallel relationship in the vertical plane after said step of anchoring the strand distal ends, rotating the lowermost apertured plate means whereby the said strands are twisted together between said plate means, said rotation imparting uniform tension on said vertically disposed strand portions disposed thereabove.

17. In a device for forming an assemblage of spaced tensioned strands, the combination comprising guide means through which strands of such assemblage to be formed pass in desired spaced relationship; movable anchor means for fixedly engaging portions of said strands passed through said guide means and maintaining said engaged strand portions a desired fixed distance relative to said guide means, and tension-creating means disposed in spaced relationship with said guide means whereby said guide means is interposed between said movable anchor means and said tension-creating means, said tension-creating means being adapted to twist strand portions interposed between said latter means and said guide means whereby a tension is created in the strand portions disposed between said movable anchor means and said guide means; said anchor means, guide means and tension-creating means being in fixed relative position during the operation of said tension-creating means.

18. In a process for forming an assemblage of tensioned strands, the steps comprising passing a plurality of strands through a guide means for maintaining said strands in desired spaced relationship, anchoring portions of said strands which have passed through said guide means in desired spaced relationship relative to each other at a desired distance from said guide means, and twisting together strand portions entering said guide means whereby a tension is imparted to said strand portions interposed between said guide means and said anchored strand portions in desired spaced relationship, the interval between said guide means and said anchored strand portions remaining constant during said process whereby the tension in said interposed strand portions increases proportionately with the amount of twisting of said strand portions entering said guide means.

19. In a device for forming an assemblage of spaced tensioned strands, the combination comprising guide means through which strands of such assemblage to be formed pass in desired spaced relationship; movable anchor means for fixedly engaging portions of said strands passed through said guide means and maintaining said strands a desired distance relative to said guide means, tension-creating means disposed in spaced relationship with said guide means whereby said guide means is interposed between said movable anchor means and said tension-creating means; said tension-creating means being adapted to twist strand portions interposed between said latter means and said guide means whereby a tension is created in the strand portions disposed between said movable anchor means and said guide means; and at least one movable anchor member adapted to be positioned between said movable anchor means and said guide means, and securing means for affixing said strands to said anchor member.

References Cited in the file of this patent

UNITED STATES PATENTS

| | | |
|---|---|---|
| 633,433 | Donovan | Sept. 19, 1899 |
| 1,447,538 | Fullington | May 6, 1923 |

FOREIGN PATENTS

| | | |
|---|---|---|
| 60,429 | Denmark | Dec. 14, 1942 |
| 528,586 | France | Aug. 20, 1921 |